United States Patent [19]

Matumoto et al.

[11] Patent Number: 5,599,478
[45] Date of Patent: Feb. 4, 1997

[54] COMPENSATOR FOR A LIQUID CRYSTAL DISPLAY

[75] Inventors: Takuya Matumoto; Tadahiro Kaminade; Nishimura Suzushi; Shigeki Takigawa, all of Yokohama, Japan

[73] Assignee: Nippon Oil Company, Limited, Tokyo, Japan

[21] Appl. No.: 528,241

[22] Filed: Aug. 14, 1995

[30] Foreign Application Priority Data

Sep. 14, 1994 [JP] Japan .................................. 6-255948

[51] Int. Cl.$^6$ .......................... C09K 11/52; G02F 1/1335
[52] U.S. Cl. ........................ 252/249.01; 428/1; 349/117
[58] Field of Search ...................... 252/299.01; 359/73; 428/1

[56] References Cited

U.S. PATENT DOCUMENTS

| | | | |
|---|---|---|---|
| 4,696,990 | 9/1987 | Noonan et al. | 526/304 |
| 4,816,555 | 3/1989 | Hisgen et al. | 528/176 |
| 5,193,020 | 3/1993 | Shiozaki et al. | 359/73 |
| 5,206,752 | 4/1993 | Itoh et al. | 359/106 |
| 5,250,214 | 10/1993 | Kanemoto et al. | 252/299.01 |
| 5,326,496 | 7/1994 | Iida et al. | 252/299.01 |
| 5,460,748 | 10/1995 | Mazaki et al. | 252/299.01 |
| 5,472,635 | 12/1995 | Iida et al. | 252/299.01 |
| 5,518,783 | 5/1996 | Kawata et al. | 428/1 |

FOREIGN PATENT DOCUMENTS

| | | |
|---|---|---|
| 60-94917 | 5/1985 | Japan . |
| 3-291623 | 12/1991 | Japan . |
| 3-294821 | 12/1991 | Japan . |
| 52-24017 | 9/1993 | Japan . |
| 52-40121 | 9/1993 | Japan . |
| 52-88931 | 11/1993 | Japan . |

*Primary Examiner*—Shean C. Wu
*Attorney, Agent, or Firm*—Scully, Scott, Murphy & Presser

[57] ABSTRACT

According to the present invention there is provided a compensator for a liquid crystal display superior in the color compensating performance, capable of making color compensation of a high-speed STN-LCD and capable of freely changing the value of wavelength dispersion. The compensator is obtained by using a liquid crystalline polyester which contains 4-hydroxycinnamic acid units and catechol units as constituent units.

3 Claims, 1 Drawing Sheet

COMPENSATOR FOR A LIQUID CRYSTAL DISPLAY

BACKGROUND OF THE INVENTION

The present invention relates to a compensator for a liquid crystal display.

Recently the development of the liquid crystal display (hereinafter referred to simply as LCD) has been remarkable, and because of such features thereof as being light, thin and low in power consumption, its position as the leading part of flat panel display has been rendered steady. A supertwisted nematic (simply "STN" hereinafter) is expected to continue its wide use in OA equipment, AV equipment, portable information terminal equipment and the like because of its merit of being low in cost though inferior in image quality and speed to active matrix LCDs, e.g. TFT. Improvements have also been made actively to upgrade STN-LCD to the level of TFT-LCD in image quality and speed while making the most of its low cost merit. Among them, as methods for attaining speed-up there have been developed a method involving improvement of the driving method and a method involving reduction of cell gap. In such high-speed STNs, as a low-molecular liquid crystal for drive cell there is used a liquid crystal wherein the wavelength dispersion of birefringence takes a large value in the range from 1.14 to 1.20 in terms of a dispersion value defined as the ratio of birefringence against 450 nm wavelength light to that against 600 nm light.

Since STN-LCD is basically colored in its display, so for commercialization it is absolutely necessary to use a color compensation film, and it is a stretched film of a polycarbonate for example that is mainly used as present as a retardation film. However, the wavelength dispersion of birefringence of such polycarbonate retardation film is as small as 1.09 in terms of the value defined above and the color compensation of such high speed STN-LCDs has actually been impossible heretofore due to a too large difference in the wavelength dispersion of the two.

With a view to remedying the above-mentioned drawbacks there have been developed retardation films using a material larger in the wavelength dispersion of birefringence such as a polysulfone for example (JP5-224017A, JP5-241021A, JP5-288931A and JP6-94917A). In the case of such polysulfone films, however, although the birefringence dispersion value, which is 1.15, is larger than that of polycarbonate films, a limit is encountered, the dispersion value is a one-point fixed value and not variable, and it is difficult to effect stretching.

On the other hand, as compensating films of a twist structure having a compensating performane superior to that of conventional retardation films, the present inventors have already proposed liquid crystalline polymer type color compensation films produced by fixing a twisted nematic structure (JP3-87720A, JP3-291623A, JP3-294821A and JP4-57017A). Since these compensating films have a twist structure, a more complete color compensation could be attained in comparison with the conventional retardation films not having any twist, but as to the color compensation of high speed STN-LCD, it has been impossible to effect color compensation to a satisfactory extent due to insufficient wavelength dispersion of birefringence.

Having made extensive studies for the purpose of developing a color compensator capable of attaining a sufficiently large wavelength dispersion of birefringence to permit color compensation of high speed STN-LCD and capable of changing the wavelength dispersion value freely, while maintaining the color compensating performance of a liquid crystalline polymer type color compensator having a twisted structure, the present inventors found out that a color compensator consisting principally of a liquid crystalline polyester satisfies such requirements, the said liquid crystalline polyester containing 4-hydroxycinnamic acid units and catechol units as constituent units. Thus, we accomplished the present invention.

SUMMARY OF THE INVENTION

The present invention resides in a compensator for a liquid cystal display comprising a transparent substrate and a liquid crystalline polyester layer laminated thereon, said liquid crystalline polyester layer being obtained by fixing the orientation of a liquid crystalline polyester exhibiting a twisted nematic orientation in the state of liquid crystal assuming a glassy state at a temperature below the liquid crystal transition point thereof, and containing 3 to 40 mol % of 4-hydroxycinnamic acid units represented by formula (I) and 15 to 40 mol % of catechol units represented by formula (II):

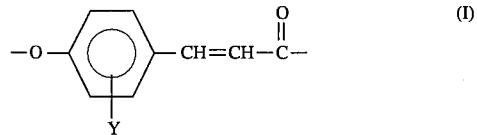

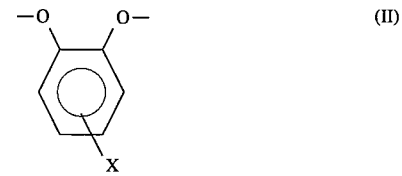

where X and Y are each independently a hydrogen atom, Cl, Br, or an alkyl group having 1 to 4 carbon atoms, the ratio of the value of birefringence for light having a wavelength of 450 nm, $\Delta n$ (450 nm), to the value of birefringence for light having a wavelength of 600 nm. $\Delta n$ (600 nm), namely ($\Delta n$ (450 nm)/$\Delta n$ (600 nm)), being in the range from 1.14 to 1.30.

As the foregoing liquid crystalline polyester there usually is employed an optically active, liquid crystalline polyester containing an optically active group or a liquid crystalline polymer composition containing an optically active compound.

The present invention also resides in a process for producing a compensator for a liquid crystal display which process comprises heat-treating a liquid crystalline polymer which exhibits a twisted nematic orientation in the state of liquid crystal and assumes a glassy state at a temperature below the liquid crystal transition point thereof and which contains 3 to 40 mol % of 4-hydroxycinnamic acid units of the formula (I) and 15 to 40 mol % of catechol units of the formula (II), on an orientation controlling film, or an alignment film, and at a temperature above the glass transition point of the said polyester, then cooling the polyester to a temperature below the glass transition point thereof to fix the twisted nematic structue and thereafter transferring the liquid crystalline polymer layer one transparent substrate.

EXPLANATION OF REFERENCE NUMERALS

Figure 1:
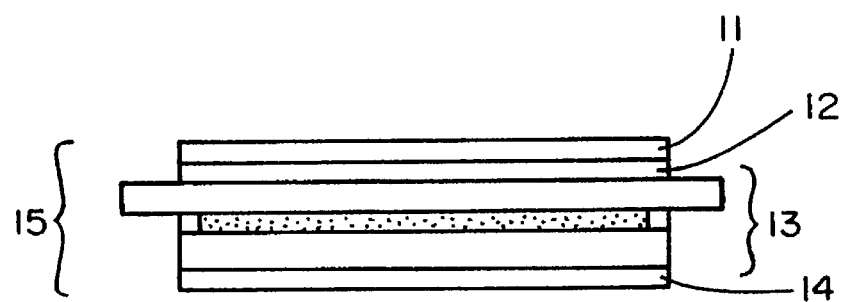
FIG. 1 is a sectional view of a liquid crystal cell used in the working examples of the present invention.

11: upper polarizing sheet
13: liquid crystal cell
14: lower polarizing sheet
21: light source-side (lower) polarizing sheet
22: rubbing axis (35°) of a light source-side substrate of the liquid crystal cell
23: rubbing axis of an exit-side substrate of the liquid crystal cell
24: molecular orientation axis (55°) of a light source-side interface of a color compensation film
25: molecular orientation axis of an exit-side interface of a color compensation film exit-side polarizing sheet
27: molecular twist (250°) in the liquid crystal cell
28: molecular twist (−250°) in the color compensation film
29: angle (80°) of the exit-side polarizing sheet
100: angle (−10°) of the light source-side polarizing sheet

DETAILED DESCRIPTION OF THE INVENTION

The present invention will be described in detail hereinunder.

It is essential that the liquid crystalline polyester used in constituting the compensator of the present invention contain units (hereinafter referred to as "4-hydroxycinnamic acid units") represented by the foregoing general formula (I) and units ("catechol units" hereinafter) represented by the foregoing general formula (II). The 4-hydroxycinnamic acid units are usually derived from a polyester-forming functional derivative such as 4-hydroxycinnamic acid or acetoxycinnamic acid, and play an important part in enlarging the wavelength dispersion of birefringence. On the other hand, the catechol units are usually derived from such a polyester-forming functional derivative as catechol, a substituted catechol, or a diacetate thereof, and play an important role in glass-fixing the orientation of liquid crystal. The proportion of the 4-hydroxycinnamic acid units in the polymer is in the range of 3 to 40 mol %, preferably 5 to 30 mol %. The higher the content thereof, the larger the dispersion value available. If the proportion in question is less than 3 mol %, it will be impossible to achieve the object of the present invention because of a small increase of the dispersion value, and a larger proportion than 40 mol % will result in deteriorated orientability. Thus, both such proportions are not desirable. The proportion of the catechol units in the polymer is in the range of 15 to 40 mol %, preferably 20 to 35 mol %. A lower proportion thereof than 15 mol % is not desirable because it would cause deterioration of the glass-fixing ability of the polymer and a higher proportion than 40 mol % is not desirable, either, it would cause deterioration of the liquid crystallinity itself.

The liquid crystalline polyester used in the present invention covers not only a liquid crystalline polyester itself but also a liquid crystalline polyester composition containing another compound. As preferred examples of the catechol units, mention may be made of the following:

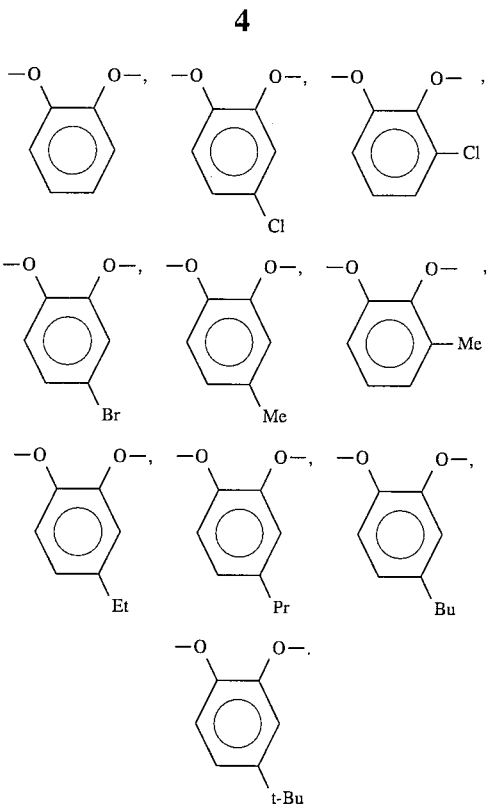

Above all, the following catechol units are preferred:

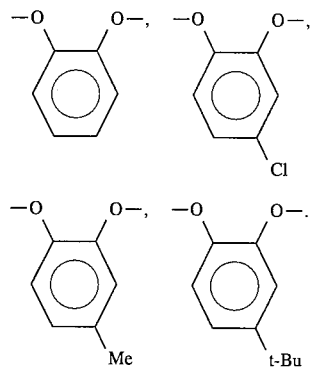

As preferred examples of the 4-hydroxycinnamic acid, mention may be made of the following:

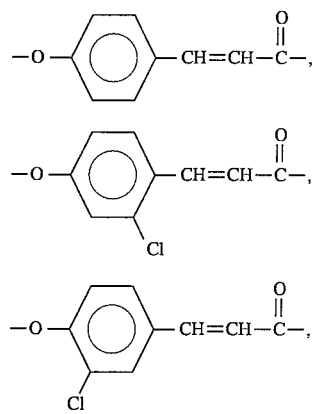

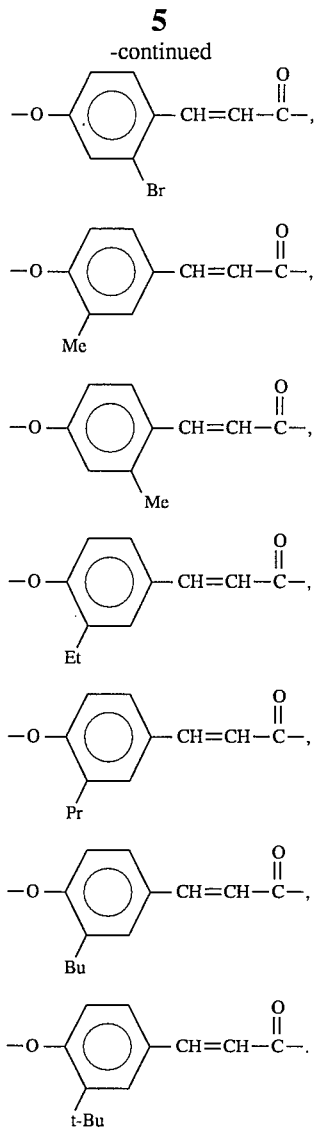

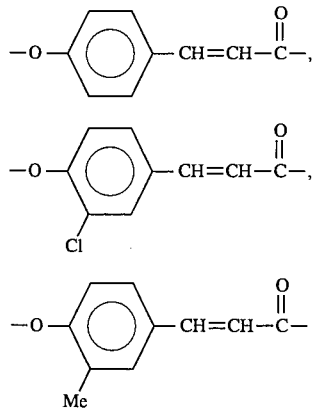

(Me: methyl, Et: ethyl, Pr: propyl, Bu: butyl)

As other constituent units employable in constituting the polyester used in the present invention, there are mentioned (a) units ("dicarboxylic acid units" hereinafter) derived from dicarboxylic acids, (b) units ("diol units" hereinafter) derived from diols, and (c) units ("hydroxycarboxylic acid units" hereinafter) derived from hydroxycarboxylic acids containing both carboxyl group and hydroxyl group in one unit. The polyester used in the present invention is prepared by using these units as necessary in addition to the 4-hydroxycinnamic acid units and catechol units explained above.

As examples of the dicarboxylic acid units, mention may be made of the following:

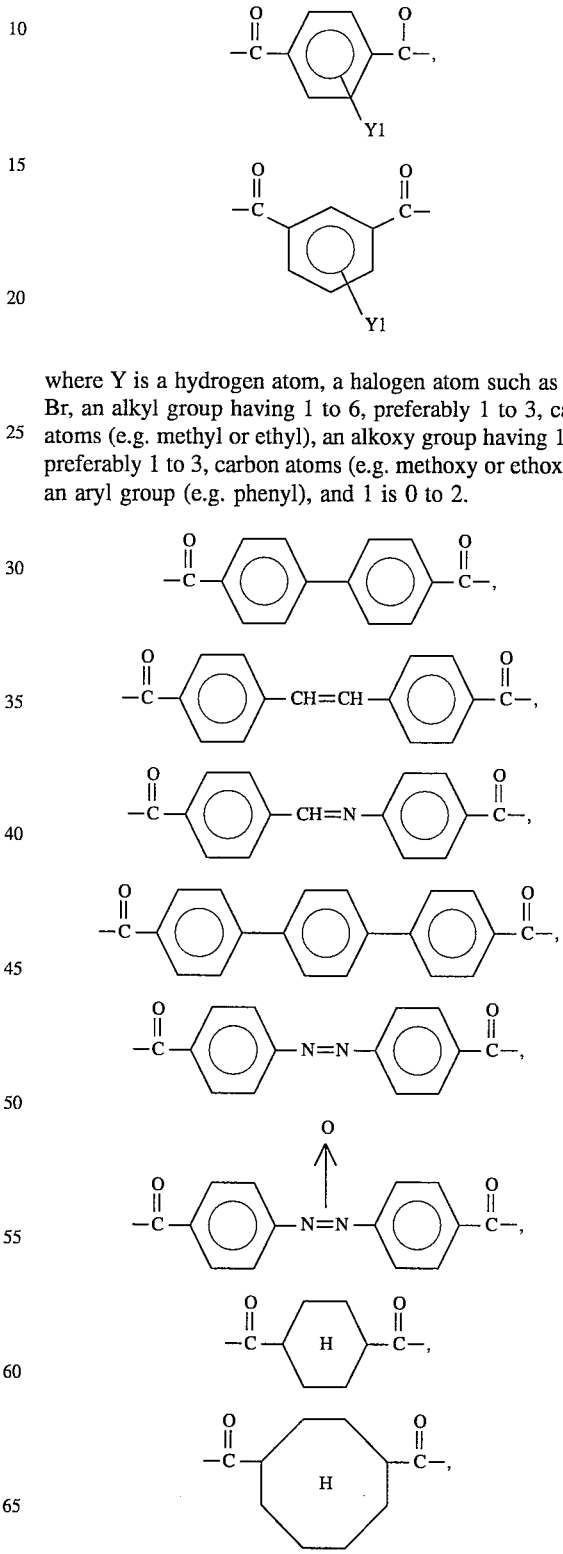

where Y is a hydrogen atom, a halogen atom such as Cl or Br, an alkyl group having 1 to 6, preferably 1 to 3, carbon atoms (e.g. methyl or ethyl), an alkoxy group having 1 to 6, preferably 1 to 3, carbon atoms (e.g. methoxy or ethoxy), or an aryl group (e.g. phenyl), and 1 is 0 to 2.

-continued

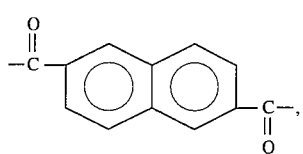

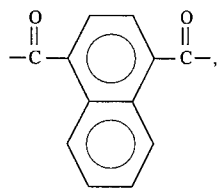

As examples of the diol units, the following may be mentioned:

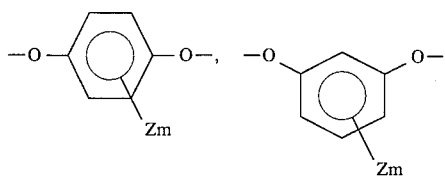

where Z is a hydrogen atom, a halogen atom such as Cl or Br, an alkyl group having 1 to 6, preferably 1 to 3, carbon atoms (e.g. methyl or ethyl), an alkoxy group having 1 to 6, preferably 1 to 3, carbon atoms (e.g. methoxy or ethoxy), or an aryl group (e.g. phenyl), and m is 0 to 2.

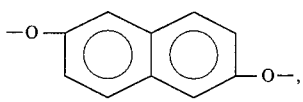

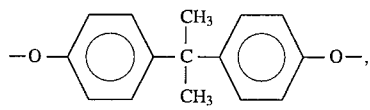

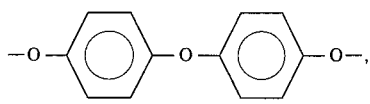

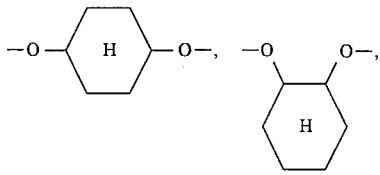

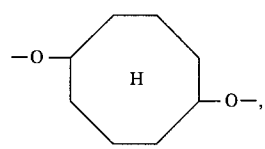

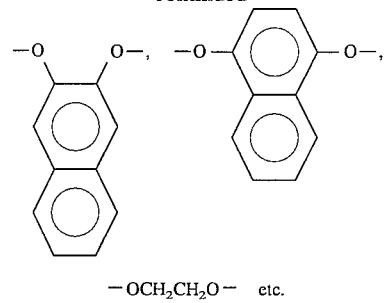

$-OCH_2CH_2O-$ etc.

As examples of the hydrocarboxylic acid units, the following may be mentioned:

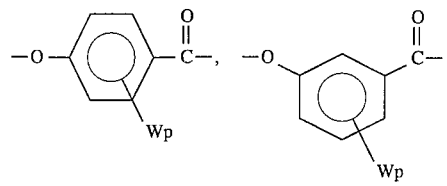

where W is a hydrogen atom, a halogen atom such as Cl or Br, an alkyl group having 1 to 6, preferably 1 to 3, carbon atoms (e.g. methyl or ethyl), an alkoxy group having 1 to 6, preferably 1 to 3, carbon atoms (e.g. methoxy or ethoxy), or an aryl group (e.g. phenyl), and p is 0 to 2.

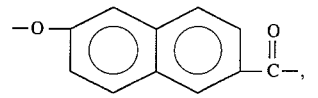

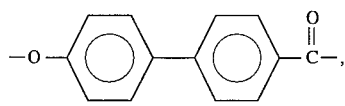

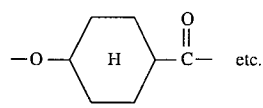

It is preferred that these polymers range in molecular weight usually from 0.05 to 3.0, preferably 0.07 to 2.0, in terms of an inherent viscosity determined at 30° C. in any of various solvents, for example a mixed phenol/tetrachloroethane (60/40) solvent. If the inherent viscosity is lower than 0.05, the strength of the resulting polymer will be low, and if it is higher than 3.0, there will arise such problems as deterioration of orientability and an increase of the time required for orientation of liquid crystal because of too high viscosity.

The glass transition points of these polyesters are also important, exerting influence on the stability of orientation after the fixing thereof. Assuming that the working temperature is generally room temperature or thereabouts, though it also depends on the use, it is desirable that the glass transition points of the polyesters be not lower than 0° C., more preferably not lower than 30° C. If the glass transition point is lower than these temperatures, the use of the compensator at room temperature or thereabouts may cause a change of the liquid crystal structure once fixed, thus resulting in deterioration of a function based on the liquid crystal structure.

How to prepare the liquid crystalline polyester used in the present invention is not specially limited. There may be adopted any of the polymerization processes known in this field, for example a melt polymerization process or a solution polymerization process using an acid chloride of a corresponding dicarboxylic acid.

According to a melt polycondensation process, the polyester can be prepared by polymerizing, for example, 4-acetoxycinnamic acid or a substituted 4-acetoxycinnamic acid, catechol or a substituted catechol, and other constituent units required such as a dicarboxylic acid and an acetylated compound of a diol, at a high temperature and in a high vacuum. The molecular weight thereof can be adjusted easily by controlling the polymerization time or the feed composition. For accelerating the polymerization reaction there may be used a known metal salt such as sodium acetate.

In the case of using a solution polymerization process, the polyester can be prepared by dissolving, for example, 4-hydroxycinnamic acid chloride, catechol and other constructional units required such as a decarboxylic acid dichloride and a diol in a solvent and heating the resulting solution in the presence of an acid acceptor such as pyridine.

The following are concrete and preferred examples of the polyester:

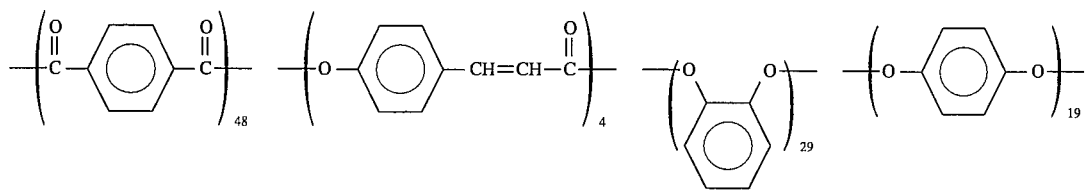

The above does not represent a block polymer but represents constituent units and mol % in the composition thereof, as will also be the case in the following.

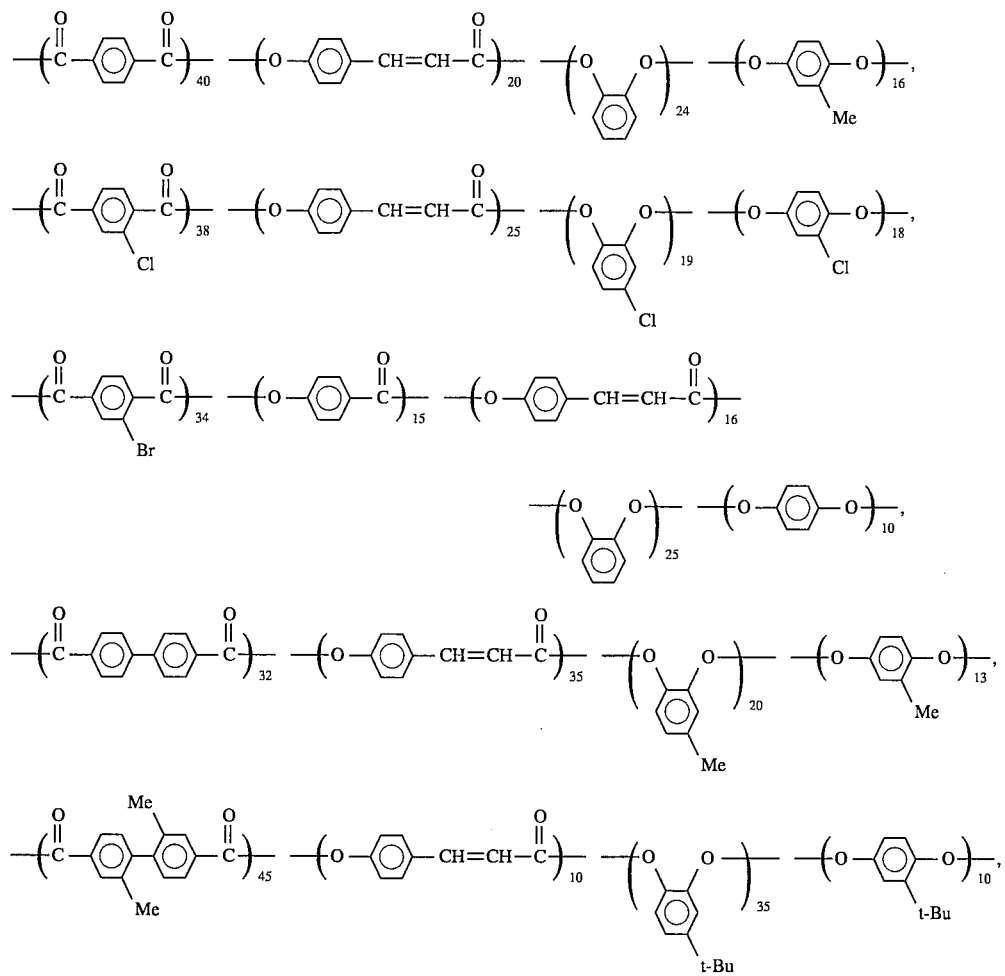

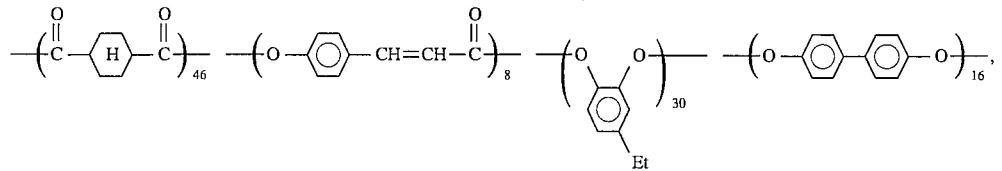
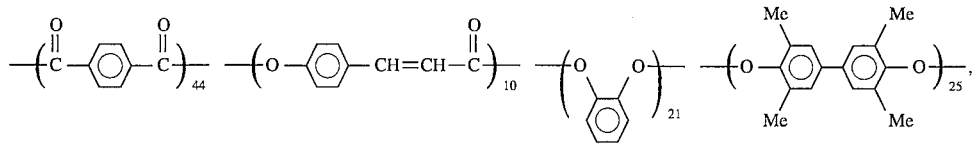
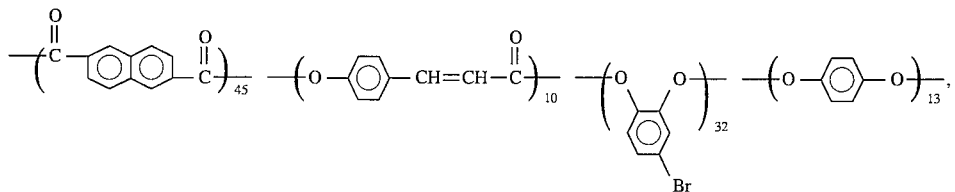
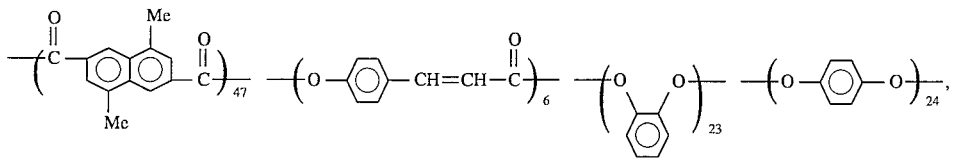
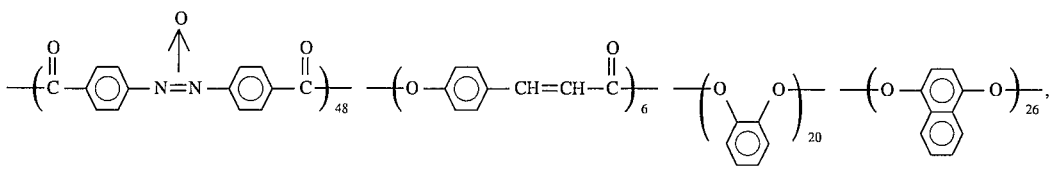
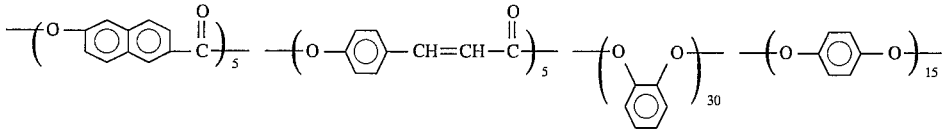
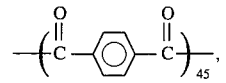
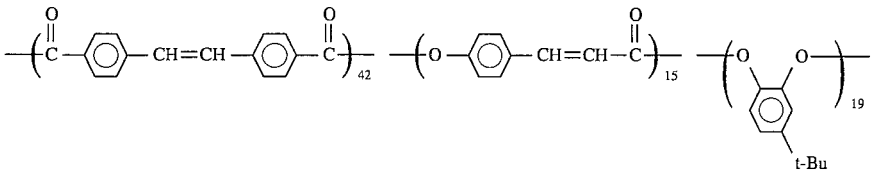
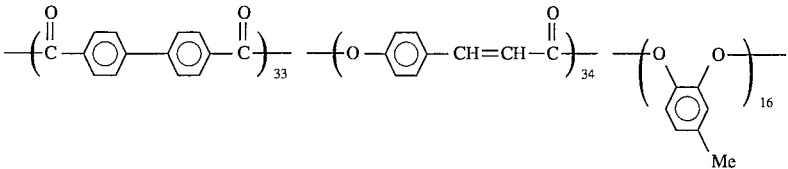

The liquid crystalline polyester used in the present invention is based on any of the above polyesters. For producing a compensation film large in the dispersion of birefringence and having a twisted structure it is necessary to impart optical activity to those basic polyesters. To this end, two methods are available.

According to the first method for the impartment of optical activity, optically active units are introduced into the polymer structures explained above. More specifically, the following structural units can be exemplified (the * mark in the following structural formulas represent an optically active carbon):

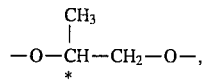

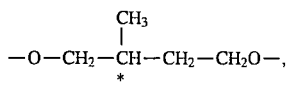

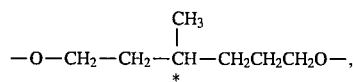

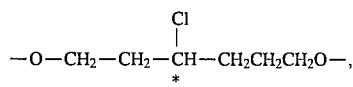

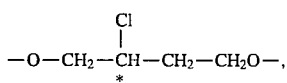

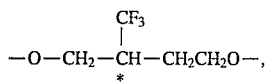

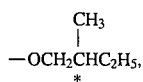

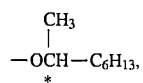

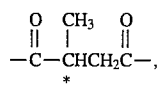

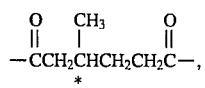

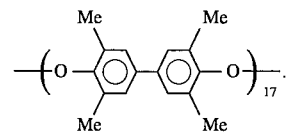

-continued

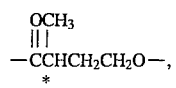

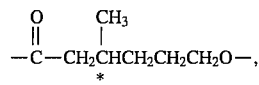

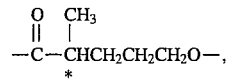

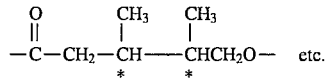 etc.

In each of these polymers the proportion of an optically active group is usually in the range of 0.5 to 20 mol %, preferably 1 to 15 mol %.

These polymers range in molecular weight usually from 0.05 to 3.0, preferably 0.07 to 2.0, in terms of an inherent viscosity determined at 30° C. in any of various solvents, for example a mixed phenol/tetrachloroethane (60/40) solvent. If the inherent viscosity is lower than 0.05, the strength of the resulting polymer will be low, and and an inherent viscosity higher than 3.0 will cause such problems as deterioration of orientability and an increase of the time required for orientation of liquid crystal due to a high viscosity. Also important are the glass transition points of these polyesters, which influence the stability of orientation after fixing thereof. Since the compensator is generally used at room temperature or thereabouts, though depending on for what purpose it is to be used, it is desirable that the glass transition points be usually not lower than 0° C., more preferably not lower than 30° C. In the case where the glass transition points are lower than these temperatures, if the compensator is used at room temperature or thereabouts, there may occur a change in the liquid crystal structure which has once been fixed, thus sometimes resulting in deterioration of the function derived from the liquid crystal structure.

No special limitation is placed on the method for preparing the liquid crystalline polyester used in the present invention. There may be adopted any of the same polymerization processes as those noted previously, for example a melt polymerization process or a solution polymerization process using a corresponding dicarboxylic acid chloride. The following polyesters are concrete and preferred examples.

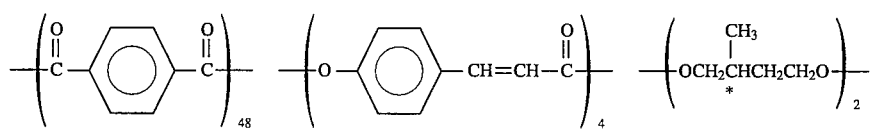

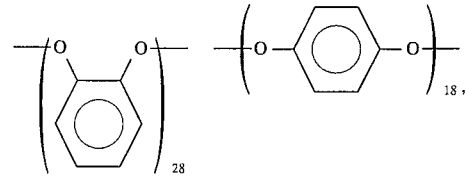
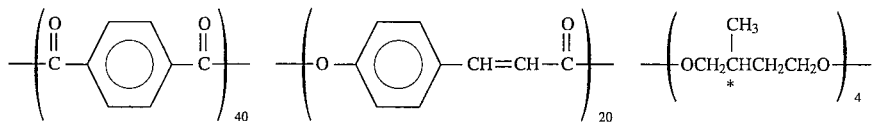
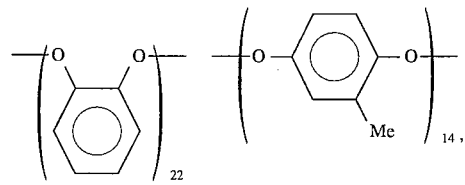
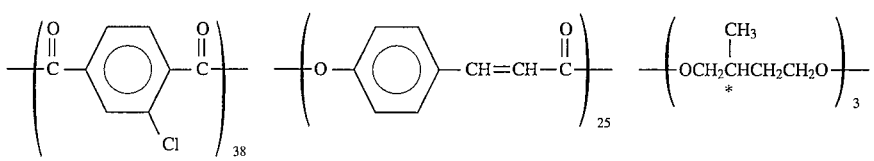
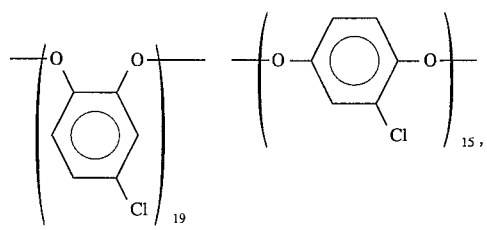
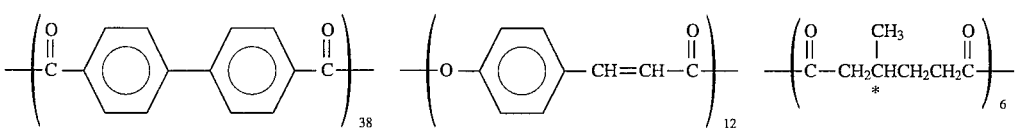
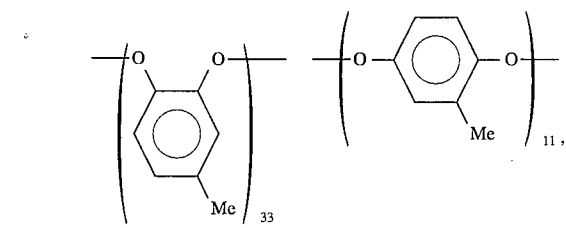
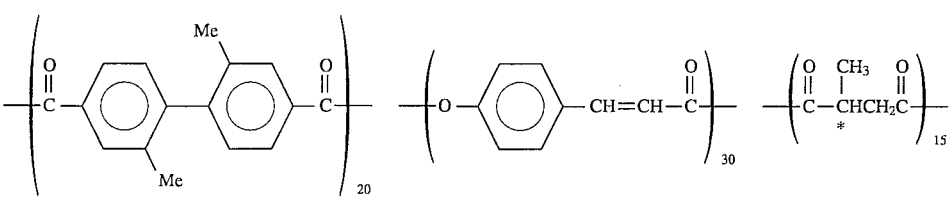
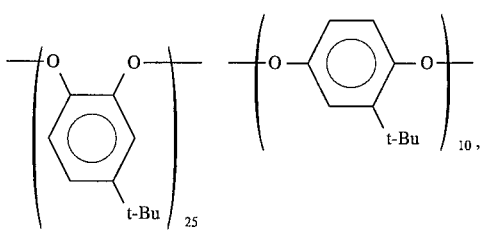

-continued

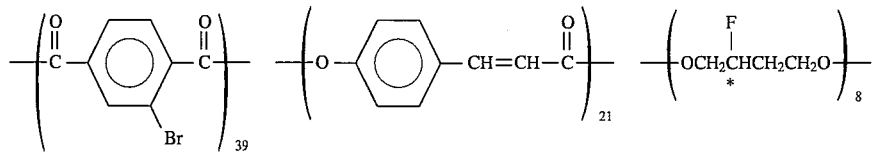

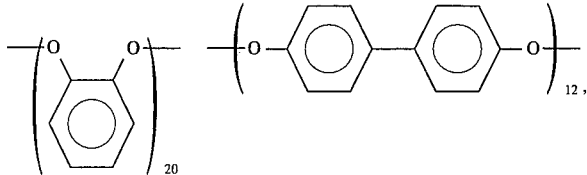

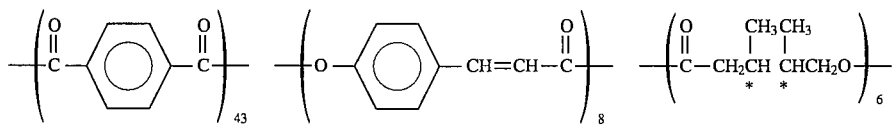

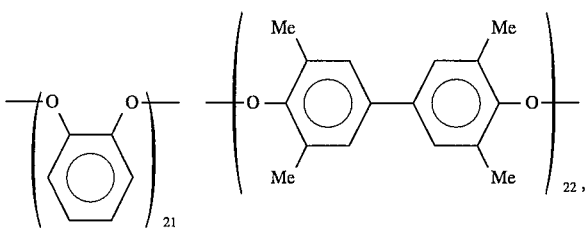

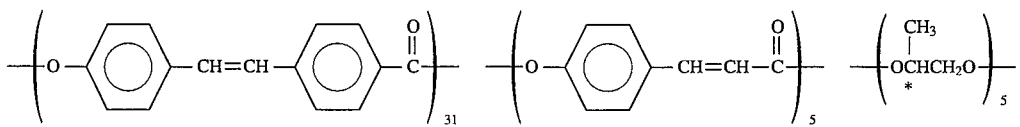

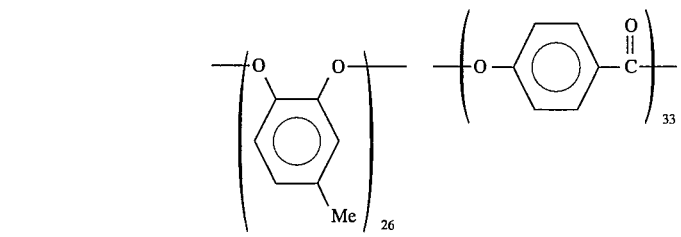

* shows an optically active carbon.

According to the second method for the impartment of optical activity, there is used a composition with an optically active compound incorporated into any of the foregoing liquid crystalline polyesters not containing an optically active unit. As the optically active compound, mention may be made first of an optically active, low molecular compound. Any compound is employable if only it possesses optical activity, but from the standpoint of compatibility it is desirable to use an optically active, liquid crystalline compound Examples are as follows:

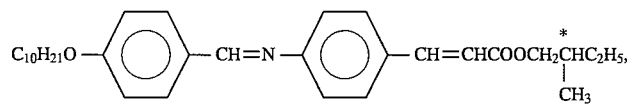

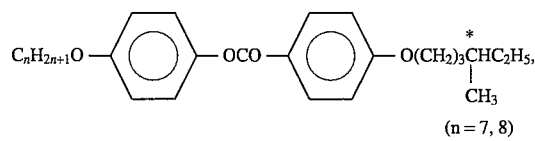

(n = 7, 8)

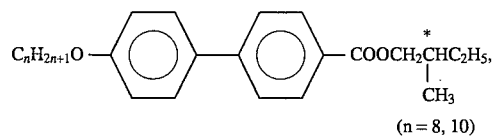

(n = 8, 10)

-continued

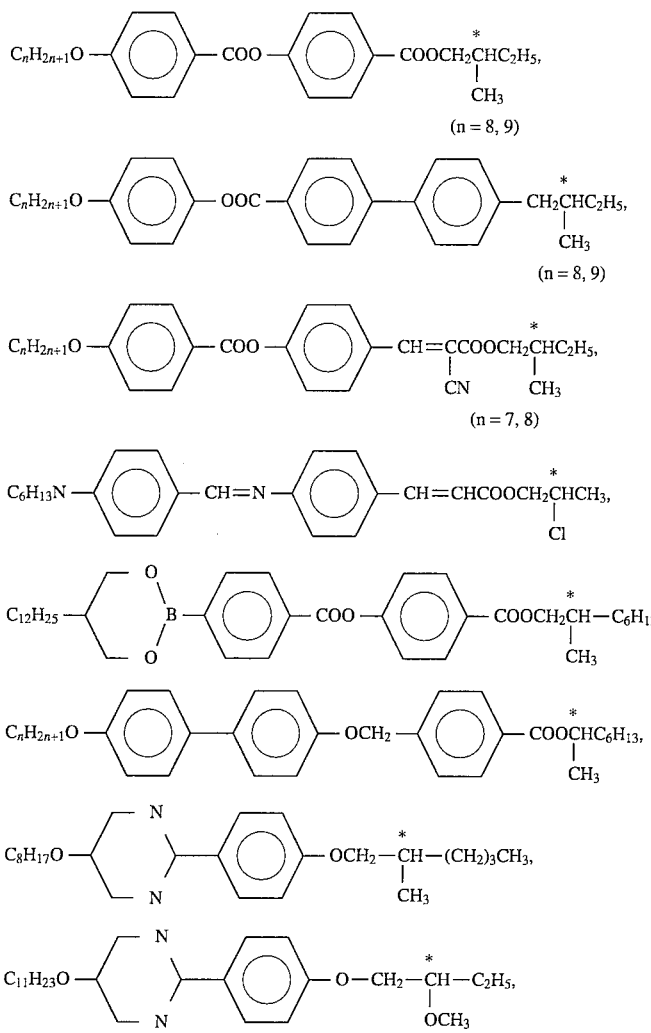

choresterol derivatives, etc.

As the optically active compound in question, mention may be made next of an optically active, high molecular compound. In this case, any high polymer is employable if only it contains an optically active group in the molecule thereof. From the standpoint of compatibility with the base polymer, a liquid crystalline polymer is desirable. Examples are liquid crystalline polyacrylates, polymethacrylates, polymalonates, polysiloxanes, polyesters, polyamides, polyester amides, polycarbonates, polypeptides and celluloses, each having an optically active group. Above all, aromatics-based, optically active polyesters are most preferred in view of the compatibility with a nematic, liquid crystalline polymer as the base polymer. As examples, mention may be made of the following:

Polymer having the structural units:

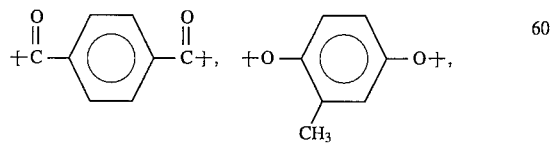

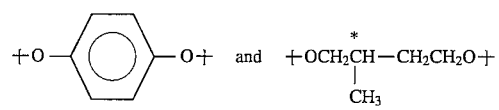

Polymer having the structural units:

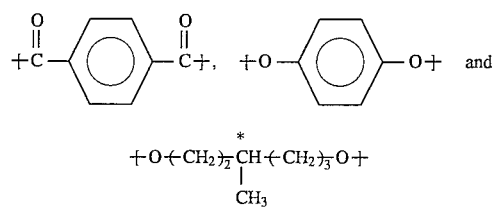

Polymer having the structural units:

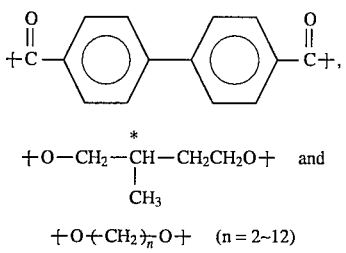

and

+O(CH₂)ₙO+  (n = 2~12)

Polymer having the structural units:

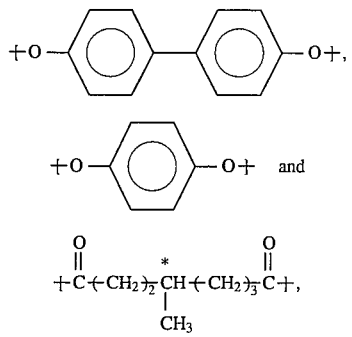

Polymer having the structural units:

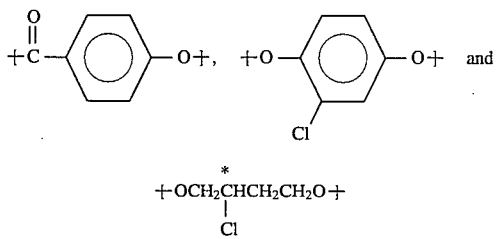

Polymer having the structural units:

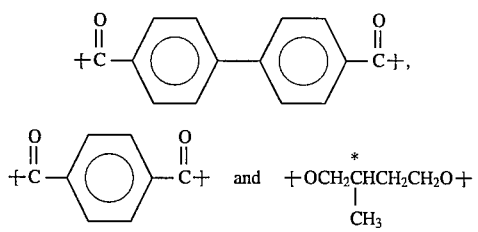

Polymer having the structural units:

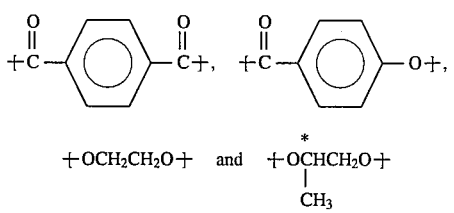

Polymer having the structural units:

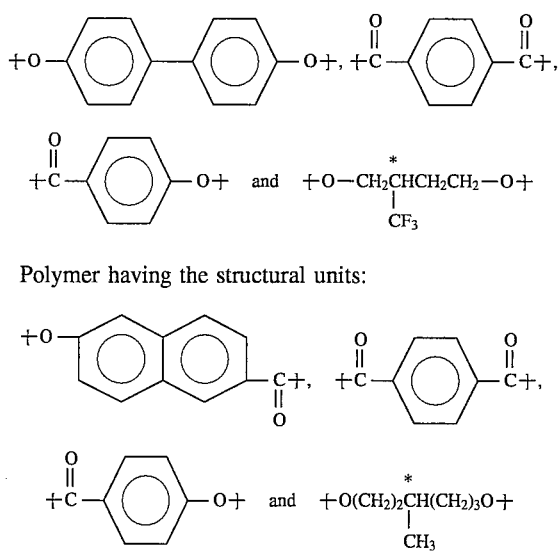

Polymer having the structural units:

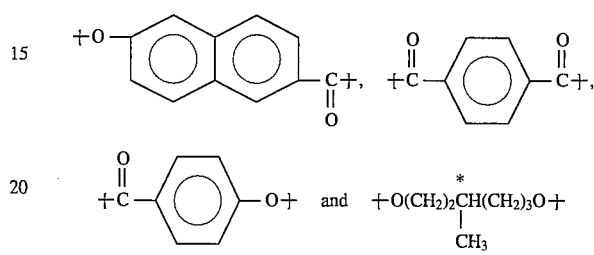

Polymer having the structural units:

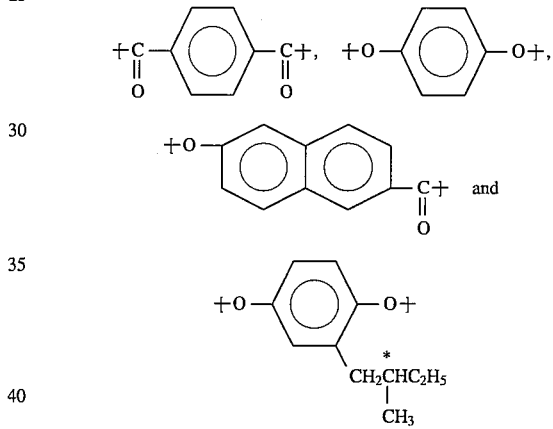

Polymer having the structural units:

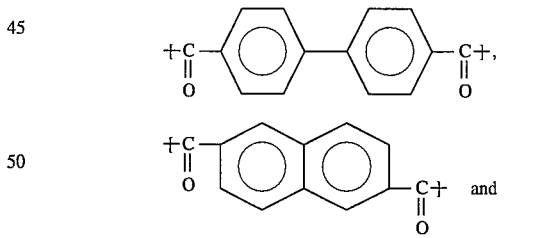

Polymer having the structural units:

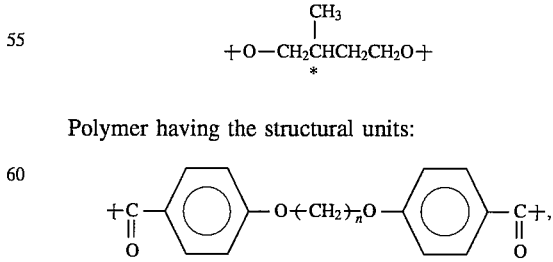

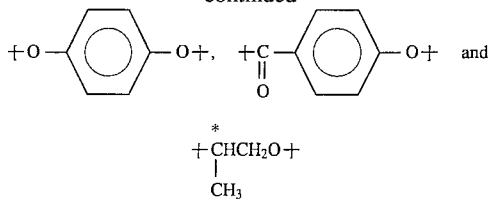

Polymer having the structural units:

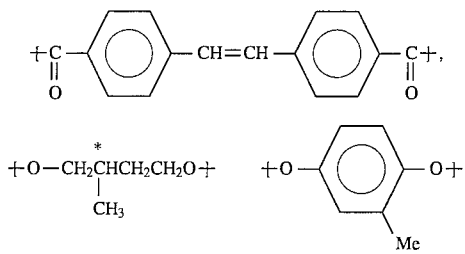

The proportion of optically active groups in these polymers is usually in the range of 0.5 to 80 mol %, preferably 5 to 60 mol %.

These polymers preferably range in molecular weight from 0.05 to 5.0 in terms of an inherent viscosity determined at 30° C. in phenol/tetrachloroethane for example. An inherent viscosity higher than 5.0 is not desirable because of too high viscosity which may eventually cause deterioration of orientability, and an inherent viscosity lower than 0.05 sometimes makes it difficult to control the composition.

The composition in question can be prepared by mixing the liquid crystalline polyester as the base polymer and the optically active compound in a predetermined ratio according to a solid-mixing, solution-mixing or melt-mixing method. Generally, the proportion of the optically active compound in the composition is preferably in the range of 0.1 to 30 wt %, more preferably 0.5 to 20 wt %, though it differs depending on the proportion of optically active groups contained in the optically active compound or on the twisting force of the same compound for imparting twist to the liquid crystalline polyester. If the proportion of the optically active compound is less than 0.1 wt %, a sufficient twist may not be imparted to the liquid crystalline polyester, and a proportion thereof greater than 30 wt % may exert a bad influence on the orientability.

The color compensator of the present invention is produced by allowing the polymer explained above to exhibit a twisted nematic orientation on an orienting substrate having a liquid crystalline polymer orienting ability and then fixing the orientation. If the orienting substrate is transparent and optically employable, it can be used as it is as a transparent substrate. In the case where the orienting substrate is not transparent or is greatly anisotropic optically, the compensator is produced by transferring the liquid crystalline polymer layer obtained by fixing the twisted nematic orientation, from the orienting substrate onto another transparent substrate.

As concrete examples of the orienting substrate are mentioned a rubbing-treated polyimide or polyvinyl alcohol film, a glass or plastic film having an obliquely vapor-deposited film of silicon oxide, and a plastic film which has been subjected to a stretching treatment or whose surface has been subjected directly to a rubbing treatment. Typical examples of plastic films include films of acrylic resins, e.g. polymethyl methacrylate, polyvinyl alcohols, polystyrenes, polycarbonates, polyether sulfones, polyphenylene sulfides, polyolefins, polyimides, polyamide-imide resins, polyether imides, polyamides, polyether ketone, polyether ether ketone, polyketone sulfides, polysulfones, polyphenylene oxides, polyethylene terephthalates, polybutylene terephthalates, polyacetals, epoxy resins, and phenolic resins.

The production of the compensator according to the present invention is carried out by using a liquid crystalline polymer composition containing an optically active, liquid crystalline polyester or an optically active compound and also using a substrate. More specifically, the polymer is first applied uniformly onto an orienting substrate and then heat-treated at a temperature above the liquid crystal transition point of the polymer in the state of liquid crystal to develop a twisted nematic orientation, followed by cooling to fix the twisted nematic orientation. The application of the polymer onto the orienting substrate is performed usually in the state of solution or in a melted state. In the case of preparing a solution, the solvent which is employable differs depending on the kind of polymer used, but usually employed is, for example, any of halogenated hydrocarbons such as chloroform, dichloroethane, tetrachloroethane, trichloroethylene, tetrachloroethylene and orthodichlorobenzene, mixed solvents thereof with phenols, tetrahydrofuran, dimethylformamide, dimethylacetamide, dimethyl sulfoxide, and N-methylpyrrolidone. The concentration of the solution differs according to what polymer-solvent combination is used, but usually it is in the range of 5% to 50%, preferably 10% to 30%. For the application of the solution onto the orienting substrate there may be adopted, for example, spin coating method, roll coating method, printing method, dipping/pulling-up method, or curtain coating method. After the coating, the solvent is removed by drying and then heat treatment is performed to complete a twisted nematic orientation structure of monodomain. For assisting the orientation based on the interfacial effect, the lower the polymer viscosity, the better, and hence the higher the heat treatment temperature, the more preferable, provided the heat treatment temperature must be lower than the transition temperature to an isotropic phase because in many cases liquid crystalline polymers have an isotropic phase in a higher temperature region relative to the liquid crystal phase. Further, in a certain polymer, the twist angle obtained may differ depending on the heat treatment temperature, and in this case it is necessary to set the heat treatment temperature so as to afford a desired twist angle. Usually, the range of 50° to 300° C. is preferable and the range of 100° to 260° C. is more preferable. The heat treatment time required for obtaining a satisfactory orientation in the state of liquid crystal on the orienting substrate depends on the polymer composition and heat treatment tempeature, so cannot be determined sweepingly, but preferably it is in the range of 10 seconds to 120 minutes, more preferably 30 seconds to 60 minutes. If the said time is shorter than 10 seconds, the orientation obtained will be unsatisfactory, and if it is longer than 120 minutes, the productivity will be deteriorated.

In this way it is possible to obtain a uniform, twisted, nematic orientation throughout the whole upper surface of the orienting substrate in the state of liquid crystal.

By subsequent cooling to a temperature below the glass transition point of the liquid crystalline polyester used, the oriented state thus obtained can be fixed without impairing the uniformity of the orientation at all. Generally, in the case of using a polymer having crystal phase in a lower temperature region relative to the liquid crystal phase, the orientation in the state of liquid crystal may be destroyed by cooling. In the present invention, such phenomenon does not occur because there is used a polymer having glass phase in a temperature region below the temperature region of liquid crystal phase, and it is possible to fix the twisted nematic orientation of monodomain completely.

The cooling rate is not specially limited. Such orientation is fixed by mere transfer from within the heating atmosphere into an atmosphere held at a temperature below the glass transition point of the liquid crystalline polymer. For enhancing the production efficiency there may be adopted a forced cooling such as air cooling or water cooling. In some polymer, however, the resulting twist angle may differ slightly depending on the cooling rate. In the case of using such a polymer, it is preferred that the cooling operation be done under controlled conditions.

The film thus obtained can be used as it is as a compensator if the orienting substrate used is transparent and isotropic optically. Even in the case where a substrate of a low transmittance such as a polyimide substrate is used, the resulting film is applicable to a use which utilizes reflection characteristics. There may be adopted another compensator producing method according to the present invention, in which, after fixing the polymer orientation on an orienting substrate, the liquid crystal layer is separated from the substrate and transferred onto another transparent substrate more suitable for optical uses. For example, in the case where the orienting substrate used is necessary for obtaining an oriented state but exerts an undersirable influence on the propoerties for use as an optical element, that substrate may be removed from the liquid crystal film after the fixation of orientation. More specifically, the following method may be adopted.

The resulting liquid crystal layer on the orienting substrate and another transparent substrate are laminated together using an adhesive or a pressure-sensitive adhesive. Next, the liquid crystal layer and the transparent film are separated at the interface of the orienting substrate and the liquid crystal layer, allowing the liquid crystal layer to be transferred to the transparent film side, to afford a color compensation film according to the present invention.

As examples of the transparent substrate to be used, there are mentioned a glass sheet and a plastic film having both transparency and optical anisotropy. For example, there may be used any of polymethyl methacrylates, polystyrenes, polycarbonates, polyether sulfones, polyphenylene sulfides, polyarylates, amorphous polyolefins, triacetyl cellulose, and epoxy resins. Particularly preferred are polymethyl methacrylates, polycarbonates, polyether sulfones, polyarylates, triaceyl cellulose and amorphous polyolefins. As another type of example of the transparent film to be used, mention may be made of a polarizing film. The polarizing film is an optical element essential to the liquid crystal display. The use of a polarizing film as a light transmitting substrate is very convenient because it will become possible to obtain an optical element as an integrated element of both compensating film and polarizing film. Further, as an example of the transparent film used in the present invention, mention may be made of a liquid crystal display cell itself. The liquid crystal cell uses two, upper and lower glass substrates with electrodes, and by transferring the liquid crystal layer onto either or both of the upper and lower substrate faces, the glass substrates of the display cell per se serve as a compensator.

The adhesive or pressure-sensitive adhesive for bonding the transparent film and the liquid crystal layer to each other is not specially limited if only it is of an optical grade. For example, there may be used one made of an acrylic resin, epoxy resin, and so on.

The transfer of the liquid crystal layer onto the transparent film can be done by separating the orienting substrate at the interface between it and the liquid crystal layer after the bonding. As examples of the separating method there are mentioned a mechanical method using rolls or the like, a method involving dipping in a solvent which is a poor solvent for all of the constituent materials and subsequent mechanical separation, a method involving application of ultrasonic wave in a poor solvent, a method which utilizes the difference in thermal expansion coefficient between the orienting substrate and the compensation layer to create a temperature change, and a method involving dissolving off the orienting substrate itself or the alignment film thereon. Since the releasability differs depending on the adhesion between the liquid crystalline polymer and orienting substrate used, there should be adopted a method most suitable for the system concerned. In this way there is produced the compensator for a liquid crystal display of the present invention which has a three-layer structure consisting of liquid crystal layer, adhesive (or a pressure-sensitive adhesive) layer and transparent film. The thickness of the liquid crystal layer itself is in the range of 0.1 to 10 μm, preferably 0.5 to 7 μm.

The compensator thus produced may be used as it is, or a protective layer formed of a transparent plastic material may be provided thereon for surface protection. Further, it may be combined with another optical element such as a polarizing sheet for example.

In the thus-obtained compensator with the twisted nematic orientation fixed, the twist angle can be controlled freely by controlling the quantity and kind of optically active units. A suitable twist angle can be selected according to for what purpose the compensator is to be used. As an example of use, mentioned may be made of a compensator for STN-LCD. In this case, it is desirable that the twist angle be controlled in the range of 150° to 300°, preferably 180° to 280°. Retardation (the product of birefringence Δ and film thickness d) is in the range of 600 to 1,000 nm, preferably 650 to 950 nm. Also as to the compensation (e.g. color compensation) for other modes of LCDs, namely TFT-LCD, OMI-LCD and ECB-LCD, effective results will be obtained by making control to respective suitable twist angles. For example, in the case of TFT-LCD, it is desirable that the twist angle be controlled to a value in the range of 50° to 150°, more preferably 80° to 100°.

In the compensator for a liquid crystal display of the present invention, the ratio, ($\Delta n$ (450)/$\Delta n$ (600)), of the value of birefringence, ($\Delta n$ (450)), for light having a wavelength of 450 nm to the value of birefringence, ($\Delta n$ (600)), for light having a wavelength of 600 nm is in the range of 1.14 to 1.30, preferably 1.14 to 1.25.

The compensator of the present invention can be combined with various liquid crystal display cells. In this case, the compensation can be effected by sandwiching the compensator in between a drive cell and either an upper or a lower polarizing plate and setting the rubbing directions of upper and lower substrates of the drive cell as well as the polarizing plate transmission axis and upper and lower molecular axis orientation directions of the compensator so as to give optimum contrast and light transmittance. The drive cell, compensator and polarizing plates are laminated together using an adhesive or pressure-sensitive adhesive for optical use. By designing K value, retardation and twist angle of the compensator of the present invention in conformity with STN, TFT or any other LCD to be compensated and by selecting an appropriate axial arrangement of drive cell and optical elements, it is made possible to attain the image quality improvement of LCD which is intended in the invention.

The compensator for a liquid crystal display according to the present invention, when combined with various liquid crystal drive cells in STN-LCD, TFT-LCD, OMI-LCD and ECB-LCD, can exhibit various compensating effects typified by color compensation and viewing angle compensation. Particularly in the case of STN-LCD, an excellent color compensating effect can be attained, and so is for high-speed STN. Further, since optical parameters, including twist angle and wavelength dispersion value, can be controlled freely, it is also possible to effect matching to various LCD drive cells.

EXAMPLES

The following examples are given to further illustrate the present invention, but it is to be understood that the invention is not limited thereto. The analyzing methods used in those Examples are as follows.

(1) Determination of Polymer Composition

Polymer was dissolved in deuterated chloroform or deuterated trifluoroacetic acid and the polymer composition was determined using $^1$H-NMR of 400 MHz (JNM-GX400, a product of Japan Electron Optics Laboratory Co., Ltd.).

(2) Determination of Inherent Viscosity

Determined in a mixed phenol/tetrachloroethane (60/40 weight ratio) solvent at 30° C. using a Ubbelohde's viscometer.

(3) Determination by DSC (Determination of Tg)

Determined using Du Pont 990 Thermal Analyzer.

(4) Determination of Birefringence wavelength Dispersion

A nematic film sample obtained by heat treatment on a glass sheet with rubbed polyimide alignment film and subsequent cooling to fix the resulting orientation was determined for birefringence at various wavelengths using monochromatic lights of various wavelengths emitted from a monochromator and in accordance with the Senarmont method. From the data thus obtained there was determined wavelength dispersion by fitting in accordance with the Cauthy's formula. In the case of an optically active polyester, a nematic orientation-fixed film was formed and determined for dispersion value, using a polyester of the same structure and composition which had been prepared separately by replaceing the optically active units with optically inactive racemate units. In the case of a composition of a polyester not having any optically active group and an optically active compound, since the amount of the optically active compound is small and the contribution thereof to the dispersion value is not so great, a dispersion value of the base polyester alone was used as a dispersion value of the composition. As the wavelength dispersion value of birefringence there was used the following K value which is the ratio of birefringence ($\Delta n$) at a light wavelength of 450 nm to the birefringence at a light wavelength of 600 nm:

$$K = \Delta n\ (450\ nm) / \Delta n\ (600\ nm)$$

(5) Determination of Twist Angle and Retardation

Twist angle and retardation (the product of film thickness and birefringence, $\Delta nd$) were determined by applying a linearly polarized light to film and subjecting the transmitted light to polarization analysis using an ellipsometer.

Example 1

There was prepared a solution containing 22 wt % of a polymer composition comprising 97.0 wt % of a polymer of formula (1) ($\eta$inh=0.19, Tg=99° C.) and 3.0 wt % of a polymer of formula (2) ($\eta$inh=0.15) in a mixed phenol/tetrachloroethane (60/40 weight ratio) solvent. The solution was then spin-coated uniformly onto a polyether ether ketone (PEEK) film of 5 cm square whose surface had been subjected to a rubbing treatment. After drying at 100° C. for 1 hour, heat treatment was performed at 200° C. for 20 minutes to complete a twisted nematic orientation. Next, an acrylic UV curing type adhesive was applied thin to the liquid crystalline polymer side and a polyether sulfone (PES) film of 6 cm square was laminated to that side. The adhesive was cured by radiation of UV light and thereafter the PEEK film was stripped off slowly, allowing the liquid crystal layer to be transferred onto the PES film.

The compensation film thus obtained was uniform and transparent throughout the whole surface thereof and its K value, $\Delta nd$ and twist angle were 1.14, 820 nm and −230°, respectively.

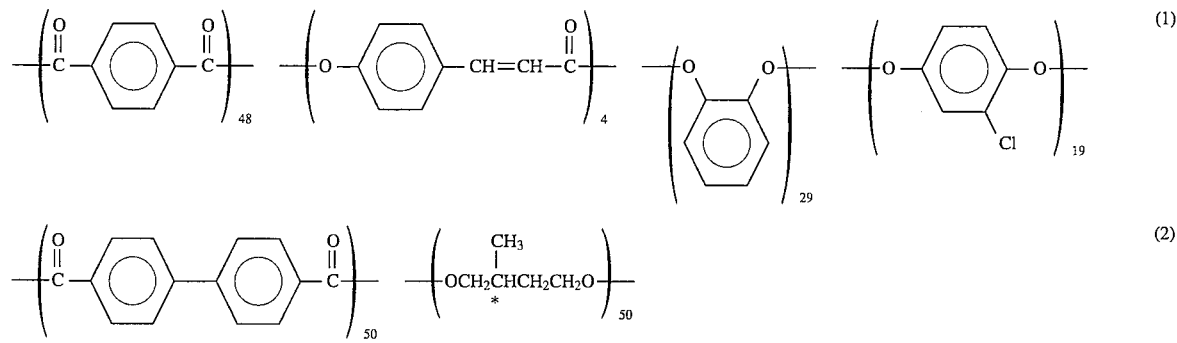

*shows an optically active carbon.

Example 2

A compensation film was prepared in the same way as in Example 1 except that a polymer of formula (3) ($\eta$inh=0.20, Tg=101° C.) was used in place of the polymer of formula (3). The film was uniform and transparent throughout the whole surface thereof and its K value, $\Delta nd$ and twist angle were 1.17, 821 nm and −232°, respectively.

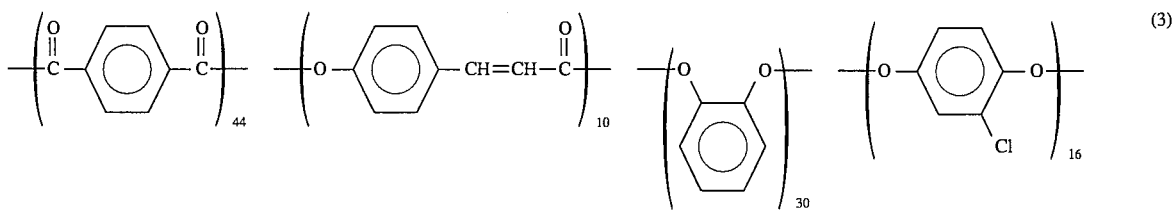

(3)

Example 3

A compensation film was prepared in the same way as in Example 1 except that a polymer of formula (4) (ηinh=0.20, Tg=92° C.) was used in place of the polymer of formula (1). The film was uniform and transparent throughout the whole surface thereof and its K value, Δnd and twist angle were 1.20, 822 nm and −230°, respectively.

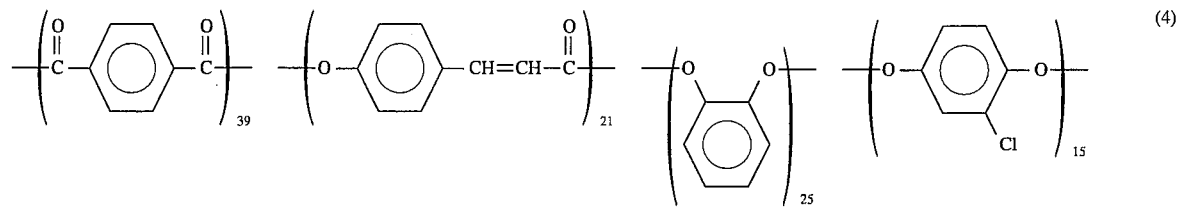

(4)

Example 4

A compensation film was prepared in the same way as in Example 1 except that a polymer of formula (5) (ηinh=0.19, Tg=83° C.) was used in place of the polymer of formula (1). The film was uniform and transparent throughout the whole surface thereof and its K value, Δnd and twist angle were 1.24, 822 nm and −232°, respectively.

film of 5 cm square whose surface had been subjected to a rubbing treatment. After subsequent drying at 100° C. for 1 hour, heat treatment was performed at 210° C. for 10 minutes to complete a twisted nematic orientation. Next, an acrylic UV curing type adhesive was applied thin to the liquid crystalline polymer side, to which was then laminated a triacetyl cellulose (TAC) film of 6 cm square. After radiation of UV light to cure the adhesive, the PPS film was stripped off slowly, allowing the liquid crystal layer to be transferred onto the TAC film.

The compensation film thus obtained was uniform and transparent throughout the whole surface thereof and its K value, Δnd and twist angle were 1.19, 838 nm and −239°, respectively.

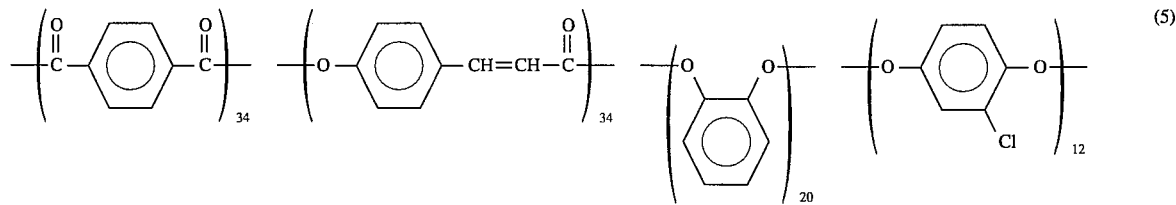

(5)

Example 5

There was prepared a solution containing 20 wt % of a polymer composition in N-methylpyrrolidone, the polymer composition consisting of 96.9 wt % of a polymer of formula (6) (ηinh=0.17, Tg=94° C.) and 3.1 wt % of a polymer of formula (7) (ηinh=0.16). The solution was then spin-coated uniformly onto a polyphenylene sulfide (PPS)

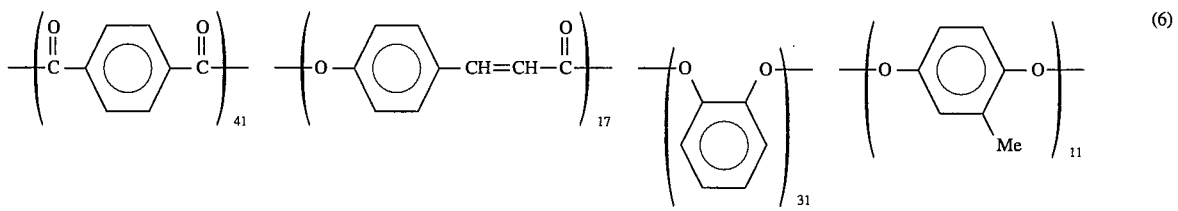

(6)

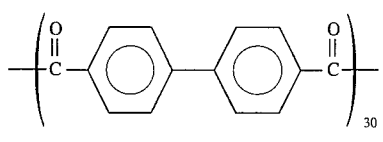
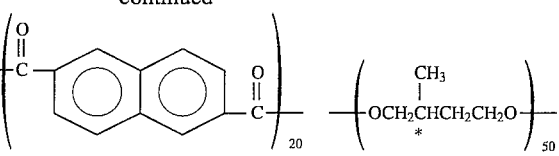

(7)

Example 6

There was prepared an N-methylpyrrolidone solution containing 15 wt % of a polymer composition consisting of 98.9 wt % of the polymer of formula (6) and 1.1 wt % of the polymer of formula (7). This solution was spin-coated uniformly onto a PPS film of 5 cm square whose surface had been subjected to a rubbing treatment. After subsequent drying at 100° C. for 1 hour, heat treatment was performed at 210° C. for 8 minutes to complete a twisted nematic orientation. Next, an acrylic UV curing type adhesive was applied thin to the liquid crystalline polymer side, to which was then laminated a TAC film of 6 cm square. After radiation of UV light to cure the adhesive, the PPS film was stripped off slowly, allowing the liquid crystal layer to be transferred onto the TAC film.

The compensation film thus obtained was uniform and transparent throughout the whole surface thereof and its K value, Δnd and twist angle were 1.19, 550 nm and −91°, respectively.

Example 7

There was prepared an dimethylformamide solution containing 20 wt % of a polymer composition consisting of 89.0 wt % of the polymer of formula (8) ($\eta$inh=0.13, Tg=88° C.) and 11.0 wt % of a polymer of formula (9) ($\eta$inh=0.11). The solution was then spin-coated uniformly onto a polyimide (PI) film of 5 cm square whose surface had been subjected to a rubbing treatment. After subsequent drying at 100° C. for 1 hour, heat treatment was performed at 220° C. for 10 minutes to complete a twisted nematic orientation. Next, an acrylic UV curing type adhesive was applied thin to the liquid crystalline polymer side, to which was then laminated a PES film of 6 cm square. After radiation of UV light to cure the adhesive, the PI film was stripped off slowly, allowing the liquid crystal layer to be transferred onto the PES film.

The compensation film thus obtained was uniform and transparent throughout the whole surface thereof and its K value, Δnd and twist angle were 1.15, 800 nm and −180°, respectively.

Example 8

There was prepared a solution containing 15 wt % of a polymer composition comprising of 93.8 wt % of a polymer of formula (10) ($\eta$inh=0.22, Tg=100° C.) and 6.2 wt % of a polymer of formula (11) ($\eta$inh=0.09) in a mixed phenol/tetrachloroethane (weight ratio: 60/40) solvent. The solution was then spin-coated uniformly onto a polyether ether ketone (PEEK) film of 5 cm square whose surface had been subjected to a rubbing treatment. After drying at 100° C. for 1 hour, heat treatment was performed at 190° C. for 30 minutes to complete a twisted nematic orientation. Next, an acrylic UV curing type adhesive was applied thin to the liquid crystalline polymer side, to which was then laminated a polyether sulfone (PES) film of 6 cm square. After radiation of UV light to cure the adhesive, the PEEK film was stripped off slowly, allowing the liquid crystal layer to be transferred to the PES film.

The compensation film thus obtained was uniform and transparent throughout the whole surface thereof and its K value, Δnd and twist angle were 1.16, 708 nm and −195°, respectively.

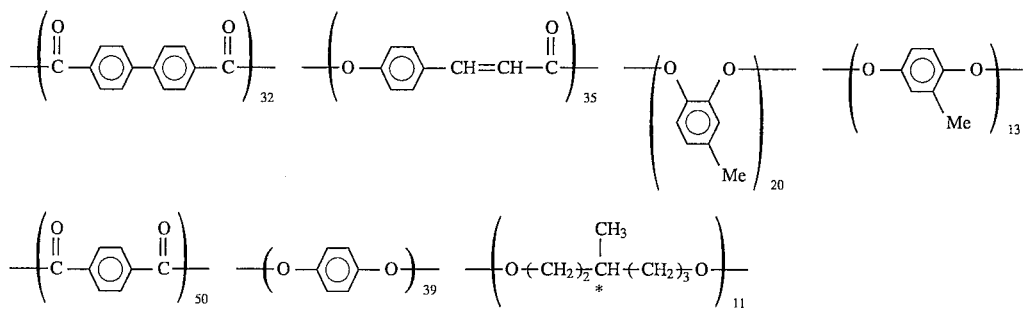

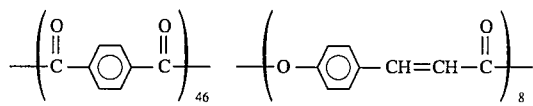 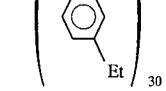 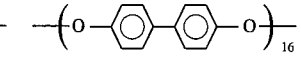 (10)

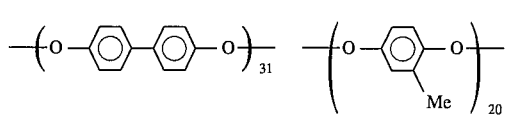 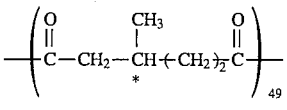 (11)

Example 9

There was prepared a solution containing 18 wt % of a polymer composition comprising of 96.5 wt % of a polymer of formula (12) (ηinh=0.25, Tg=110° C.) and 3.5 wt % of a polymer of formula (13) (ηinh=0.18) in a mixed p-chlorophenol/tetrachloroethane (weight ratio: 80/20) solvent. The solution was then spin-coated uniformly onto a PEEK film of 5 cm square whose surface had been subjected to a rubbing treatment. After drying at 100° C. for 1 hour, heat treatment was performed at 230° C. for 15 minutes to complete a twisted nematic orientation. Next, an acrylic UV curing type adhesive was applied thin to the liquid crystalline polymer side, to which was then laminated a PES film of 6 cm square. After radiation of UV light to cure the adhesive, the PEEK film was stripped off slowly, allowing the liquid crystal layer to be transferred onto the PES film.

The compensation film thus obtained was uniform and transparent throughout the whole surface thereof and its K value, Δnd and twist angle were 1.16, 902 nm and −248°, respectively.

Example 10

There was prepared an N-methylpyrrolidone solution containing 20 wt % of a polymer composition consisting of 97.2 wt % of the polymer of formula (14) (ηinh=0.16, Tg=89° C.) and 2.8 wt % of a polymer of formula (15) (ηinh=0.15). The solution was then applied uniformly onto a PEEK film of 5 cm square whose surface had been subjected to a rubbing treatment. After subsequent drying at 100° C. for 1 hour, heat treatment was performed at 200° C. for 15 minutes to complete a twisted nematic orientation. Next, an acrylic UV curing type adhesive was applied thin to the liquid crystalline polymer side, to which was then laminated a TAC film of 6 cm square. After radiation of UV light to cure the adhesive, the PEEK film was stripped off slowly, allowing the liquid crystal layer to be transferred to the TAC film.

The compensation film thus obtained was uniform and transparent throughout the whole surface thereof and its K value, Δnd and twist angle were 1.18, 811 nm and −251°, respectively.

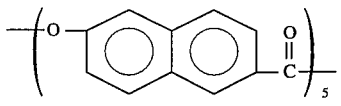 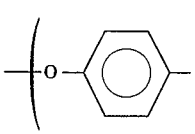 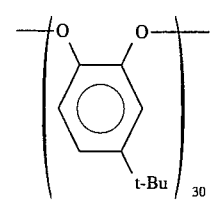 (12)

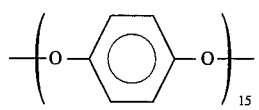 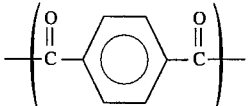

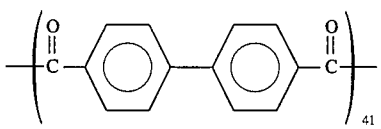 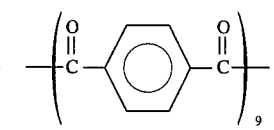 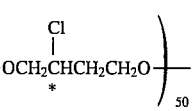 (13)

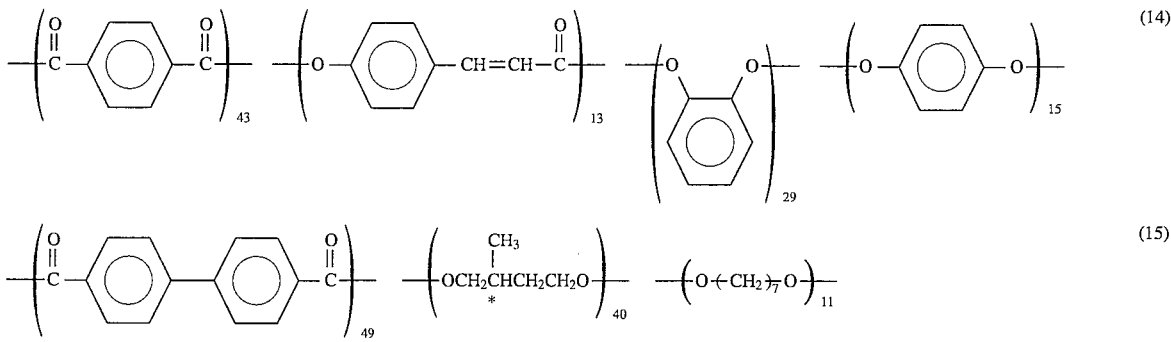

Example 11

An N-methylpyrrolidone solution containing 20 wt % of a polymer of formula (16) (ηinh=0.20, Tg=100° C.) was prepared. The solution was then applied uniformly by a roll coating method, onto a PPS film of 30 cm square whose surface had been subjected to a rubbing treatment. After subsequent drying at 90° C. for 1 hour, heat treatment was performed at 210° C. for 5 minutes to complete a twisted nematic orientation. Next, an acrylic UV curing type adhesive was applied thin to the liquid crystalline polymer side, to which was then laminated a polycarbonate (PC) film of 30 cm square. After radiation of UV light to cure the adhesive, the PPS film was stripped off slowly, allowing the liquid crystal layer to be transferred onto the PC film.

The compensation film thus obtained was uniform and transparent throughout the whole surface thereof and its K value, Δnd and twist angle were 1.15, 843 nm and −262°, respectively.

Example 12

An N-methylpyrrolidone solution containing 20 wt % of a polymer of formula (17) (ηinh=0.15, Tg=99° C.) was prepared. The solution was then applied uniformly by a roll coating method, onto a PPS film of 30 cm square whose surface had been subjected to a rubbing treatment. After subsequent drying at 90° C. for 1 hour, heat treatment was conducted at 210° C. for 7 minutes to complete a twisted nematic orientation. Next, an acrylic UV curing type adhesive was applied thin to the liquid crystalline polymer side, to which was then laminated a polycarbonate (PC) film of 30 cm square. After radiation of UV light to cure the adhesive, the PPS film was stripped off slowly, allowing the liquid crystal layer to be transferred onto the PC film.

The compensation film thus obtained was uniform and transparent throughout the whole surface thereof and its K value, Δnd and twist angle were 1.18, 810 nm and −250°, respectively.

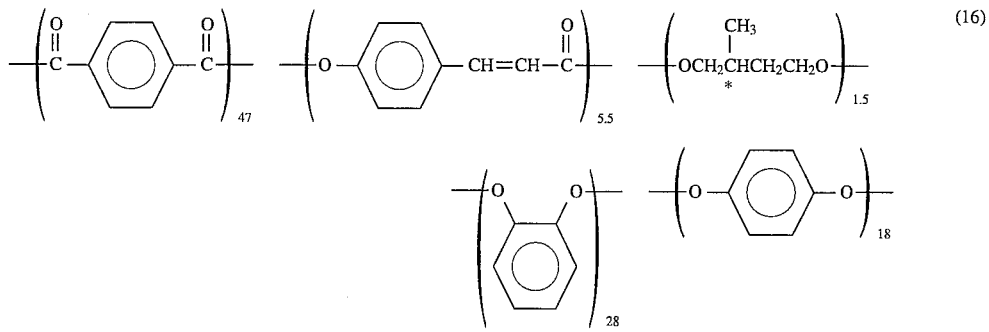

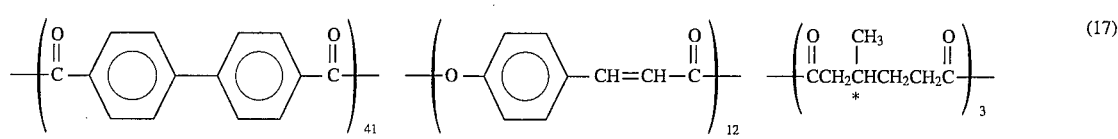

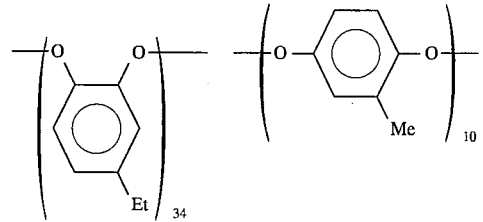

Example 13

Figure 2:
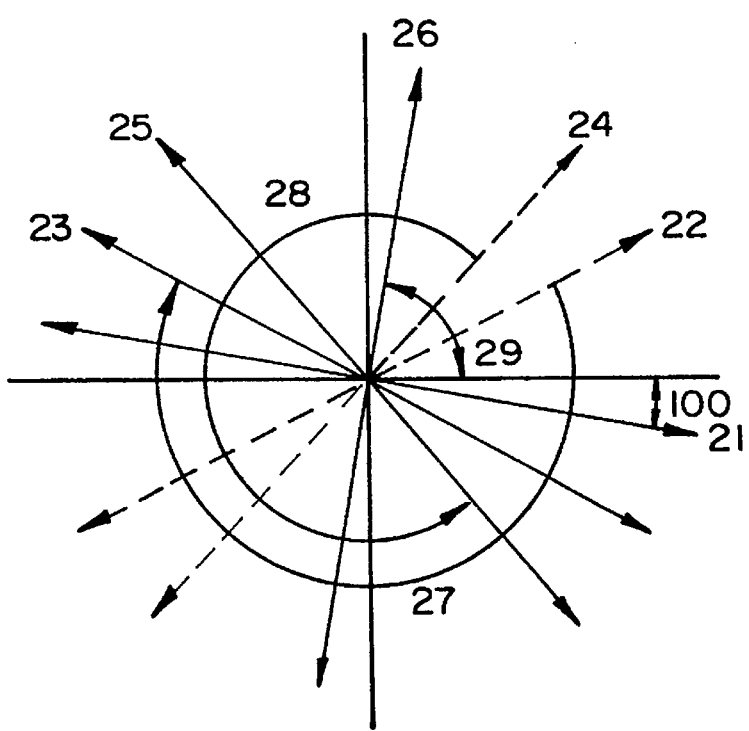
FIG. 2 shows an optical axis relation of materials which constitute the liquid crystal cell used in the working examples of the present invention.

The color compensation film prepared in Example 10 was laminated through a pressure-sensitive adhesive to a high-speed STN-LCD of a diagonal size of 9.5 inches having a duty ratio of 1/240, a twist angle of 250° and a K value of 1.18 to fabricate a cell of the construction illustrated in FIG. 1. In this case, optical elements are arranged in such an axial relation as shown in FIG. 2. This high-speed STN-LCD was measured for contrast, which was found to be as large as 130. Thus, it turned out that the high-speed STN-LCD was color-compensated completely by the color compensation film.

Example 14

A 5 cm square film was cut out in parallel with a side of the color compensation film fabricated in Example 12, and applied thin to the liquid crystalline polymer side, to which was then laminated a TAC film of 6 cm square. After radiation of UV light to cure the adhesive, the PEEK film was stripped off slowly, allowing the liquid crystal layer to be transferred onto the TAC film. The compensation film thus obtained was uniform and transparent throughout the whole surface thereof and its K value, Δnd and twist angle were 1.13, 809 nm and −250°, respectively. Using this color compensation film the high-speed STN-LCD was checked for color compensating performance in just the same manner as in Examle 13. The contrast value obtained was as low as 75. This is due to a great difference between the K value on the liquid crystal cell side and the color compensation film.

using this film, the high-speed STN-LCD having the construction of FIG. 1 and the axial arrangement of FIG. 2 was measured for contrast in just the same manner as in Example 13. As a result, like Example 13, a large contrast value of 128 was obtained, proving that the high-speed STN-LCD was color-compensated completely by the said color compensation film.

Comparative Example 1

A polymer of formula (18) (ηinh=0.19, Tg=105° C.) not containing 4-hydroxycinnamic acid was prepared. Further prepared was an N-methylpyrrolidone solution containing 97.2 wt % of the said polymer and 2.8 wt % of a polymer of formula (15). The solution was then spin-coated uniformly onto a PEEK film of 5 cm square whose surface had been subjected to a rubbing treatment. After subsequent drying at 100° C. for 1 hour, heat treatment was conducted at 200° C. for 15 minutes to complete a twisted nematic orientation. Next, an acrylic UV curing type adhesive was

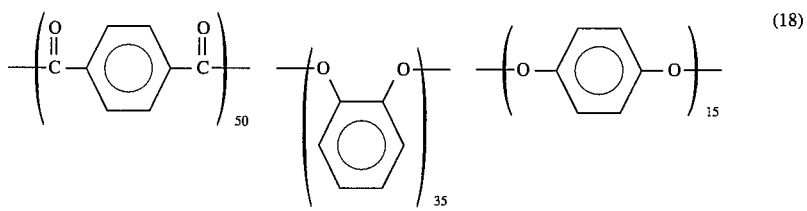

Comparative Example 2

A polymer of formula (19) (ηinh=0.20) not containing any catechol unit was prepared. Further prepared was an N-methylpyrrolidone solution containing 25 wt % of the said polymer. This solution was then applied uniformly by a spin coating method onto a PPS film of 5 cm square whose surface had been subjected to a rubbing treatment. After subsequent drying at 90° C. for 1 hour, heat treatment was conducted at 210° C. for 10 minutes to develop a twisted nematic orientation. However, when cooling was made after the heat treatment, crystallization proceeded and the film became whitely turbid, thus making it impossible to fix the twisted nematic orientation. Since the polymer used does not contain any catechol unit, a crystal phase is present in a lower temperature region than the temperature region exhibiting liquid crystal phase. It turned out that the reason why the orientation could not be fixed was because the said crystallinity obstructed glass-fixation of the liquid crystal orientation.

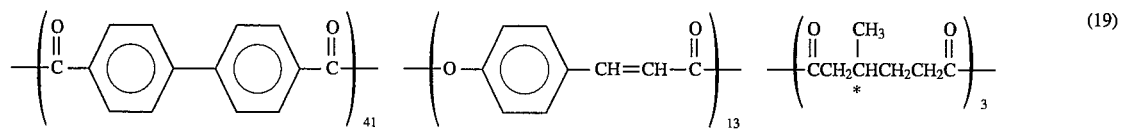

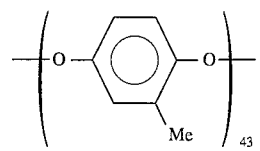

What is claimed is:

1. A compensator for a liquid cystal display comprising a transparent substrate and a liquid crystalline polyester layer laminated thereon, said liquid crystalline polyester layer being obtained by fixing the orientation of a liquid crystalline polyester exhibiting a twisted nematic orientation in the state of liquid crystal, which a glassy state at a temperature below the liquid crystal transition point thereof, and containing 3 to 40 mol % of 4-hydroxycinnamic acid units represented by formula (I) and 15 to 40 mol % of catechol units represented by formula (II):

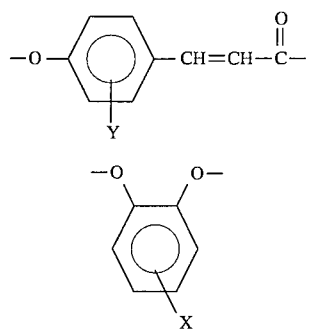

where X and Y are each independently a hydrogen atom, Cl, Br, or an alkyl group having 1 to 4 carbon atoms, the ratio of the value of birefringence for light having a wavelength of 450 nm, $\Delta n$ (450 nm), to the value of birefringence for light having a wavelength of 600 nm, $\Delta n$ (600 nm), namely ($\Delta n$ (450 nm)/$\Delta n$ (600 nm)), being in the range from 1.14 to 1.30.

2. A compensator as set forth in claim 1 wherein said liquid crystalline polyester is optically active.

3. A compensator as set forth in claim 1, wherein said liquid crystalline polyester is in the form of a liquid crystalline polymer composition containing an optically active compound.

* * * * *

UNITED STATES PATENT AND TRADEMARK OFFICE
CERTIFICATE OF CORRECTION

PATENT NO. : 5,599,478

DATED : February 4, 1997

INVENTOR(S) : Takuya Matumoto, et al.

It is certified that error appears in the above-identified patent and that said Letters Patent is hereby corrected as shown below:

On the Title Page, Section [75], line 2: "Nishimura Suzushi" should read --Suzushi Nishimura--

Column 2, line 62: "one" should read --onto a--

Signed and Sealed this

Fourth Day of August, 1998

*Attest:*

BRUCE LEHMAN

*Attesting Officer*  *Commissioner of Patents and Trademarks*